US008098632B2

(12) United States Patent
van Rensburg et al.

(10) Patent No.: US 8,098,632 B2
(45) Date of Patent: *Jan. 17, 2012

(54) APPARATUS AND METHOD FOR DOWNLINK SCHEDULING IN A SDMA-ENABLED OFDMA WIRELESS NETWORK

(75) Inventors: Cornelius van Rensburg, Dallas, TX (US); Jiann-An Tsai, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1786 days.

This patent is subject to a terminal disclaimer.

(21) Appl. No.: 11/267,738

(22) Filed: Nov. 4, 2005

(65) Prior Publication Data
US 2006/0164972 A1 Jul. 27, 2006

Related U.S. Application Data (60) Provisional application No. 60/645,648, filed on Jan. 21, 2005.

(51) Int. Cl.
*H04W 4/00* (2009.01)

(52) U.S. Cl. ............ 370/334; 370/339; 455/562.1; 455/552.1

(58) Field of Classification Search .......... 370/208, 370/334, 339; 455/552.1, 562.1
See application file for complete search history.

(56) References Cited

U.S. PATENT DOCUMENTS

| 6,480,524 | B1* | 11/2002 | Smith et al. | 375/140 |
| 7,319,685 | B2* | 1/2008 | Kim et al. | 370/337 |
| 2004/0208139 | A1* | 10/2004 | Iwamura | 370/321 |
| 2004/0252632 | A1* | 12/2004 | Bourdoux et al. | 370/210 |
| 2005/0277444 | A1 | 12/2005 | Rensburg et al. | |
| 2007/0097910 | A1* | 5/2007 | Ji et al. | 370/329 |

FOREIGN PATENT DOCUMENTS

| KR | 2003-83473 A | 10/2003 |
| KR | 2005-91586 A | 9/2005 |

* cited by examiner

*Primary Examiner* — Phuc Tran (57) ABSTRACT

A scheduler for scheduling downlink transmissions of orthogonal frequency division multiple access (OFDMA) signals using spatially directed beams to a plurality of subscriber stations in a wireless network. The scheduler schedules the downlink transmissions as a function of frequency, time, and space. The scheduler further schedules downlink transmissions to a first subscriber station based on a first null space associated with at least one subscriber station previously scheduled to receive.

20 Claims, 4 Drawing Sheets

ABSTRACT AND METHOD FOR
DOWNLINK SCHEDULING IN A
SDMA-ENABLED OFDMA WIRELESS
NETWORK

APPARATUS AND METHOD FOR DOWNLINK SCHEDULING IN A SDMA-ENABLED OFDMA WIRELESS NETWORK

CROSS-REFERENCE TO RELATED APPLICATION AND CLAIM OF PRIORITY

This application is related to U.S. Provisional Patent No. 60/645,648, filed Jan. 21, 2005, entitled "Apparatus and Method for Downlink Scheduling in an SDMA-enabled OFDMA Wireless Network". U.S. Provisional Patent No. 60/645,648 is assigned to the assignee of the present application. The subject matter disclosed in U.S. Provisional Patent No. 60/645,648 is hereby incorporated by reference into the present disclosure as if fully set forth herein. This application hereby claims priority under 35 U.S.C. §119(e) to U.S. Provisional Patent No. 60/645,648.

This application is related to U.S. patent application Ser. No. 11/128,772, filed on May 13, 2005, entitled "Apparatus And Method For Downlink Spatial Division Multiple Access Scheduling In A Wireless Network." application Ser. No. 11/128,772 is assigned to the assignee of this application and is incorporated by reference into this application as if fully set forth herein.

TECHNICAL FIELD OF THE INVENTION

The present disclosure relates generally to wireless networks and, more specifically, to a mechanism for scheduling SDMA forward channel (downlink) transmissions in an OFDMA wireless network.

BACKGROUND OF THE INVENTION

The throughput of the forward channel (or downlink) of a wireless network is significantly affected by the scheduling algorithm employed by the base stations of the wireless network. A large number of algorithms have been developed for scheduling the transmissions of voice and data traffic from base stations to subscriber stations (or mobile stations, mobile terminals, etc.). These scheduling algorithms generally allocate to each subscriber station a time slot, a frequency assignment, or a code (e.g., Walsh code), or a combination of these elements, for receiving traffic in the forward channel.

There are different types of scheduling algorithms for different types of wireless protocols. As a result, there are unique schedulers and scheduling algorithms for spatial division multiple access (SDMA) networks, time division multiple access (TDMA) networks, orthogonal frequency division multiplexing (OFDM) networks, orthogonal frequency division multiple access (OFDMA) networks, code division multiple access (CDMA) networks, and others.

New wireless standards, such as the proposed WiBro standard and the IEEE-802.16d/e standard, are being developed that will implement both OFDMA technique and SDMA techniques. Thus, a network base station will be able to transmit to subscriber stations (or mobile stations, mobile terminals, etc.) using multiple carriers (i.e., OFDMA) that are transmitted using beam-forming techniques (i.e., SDMA).

However, none of the known prior art schedulers and scheduling algorithms is specifically directed to a spatial division multiple access-enabled orthogonal frequency division multiple access (SDMA-OFDMA) downlink system.

Therefore, there is a need in the art for an improved scheduler for use in a spatial division multiple access (SDMA)-enabled orthogonal frequency division multiple access (OFDMA) wireless network.

SUMMARY OF THE INVENTION

In one embodiment, a scheduler is provided for scheduling downlink transmissions of orthogonal frequency division multiple access (OFDMA) signals using spatially directed beams to a plurality of subscriber stations in a wireless network. The scheduler schedules the downlink transmissions as a function of frequency, time, and space. The scheduler further schedules downlink transmissions to a first subscriber station based on a first null space associated with at least one subscriber station previously scheduled to receive.

In another embodiment, a base station is provided for communicating with a plurality of subscriber stations in a wireless network. The base station comprises a transceiver capable of transmitting downlink orthogonal frequency division multiple access (OFDMA) signals to the plurality of subscriber stations; an antenna array capable of transmitting the downlink OFDMA signals to the plurality of subscriber stations using spatially directed beams; and a scheduling controller capable of scheduling downlink transmissions to the plurality of subscriber stations using spatially directed transmit beams. The scheduling controller schedules a first one of the plurality of subscriber stations to receive in a first time-frequency slot based on a first null space associated with at least one subscriber station previously scheduled to receive in the first time-frequency slot.

A method is also provided for communicating with a plurality of subscriber stations in a wireless network. The method comprises the steps of: transmitting downlink orthogonal frequency division multiple access (OFDMA) signals to at least one subscriber station in a first time-frequency slot using spatially directed beams; determining a first null space associated with the at least one subscriber station; and scheduling a first subscriber station to receive in the first time-frequency slot based on the first null space. The method further comprises the steps of: determining a second one of the plurality of subscriber stations having a highest priority; determining a second null space associated with the first subscriber station and the at least one subscriber station; and scheduling a third one of the plurality of subscriber stations to receive in the first time-frequency slot based on the second null space.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure are by way of illustration only and should not be construed in any way to limit the scope of the disclosure. Those skilled in the art will understand that the principles of the present disclosure may be implemented in any suitably arranged SDMA-OFDMA wireless network.

A scheduling controller and a scheduling algorithm are disclosed for use in a wireless network comprising base stations that communicate with subscriber stations. The scheduling controller and algorithm schedule the downlink transmissions of orthogonal frequency division multiple access (OFDMA) signals using spatially directed beams as a function of frequency, time, and space. For example, downlink transmissions may be scheduled in the same frequency allocation at the same time to two spatially separated subscriber stations by transmitting to a first subscriber station using a first spatially directed beam and to a second subscriber station using a second spatially directed beam. The downlink transmissions to a specific subscriber station are scheduled based on a mathematical null space associated with subscriber stations that have been previously scheduled to receive in the same time-frequency slot as the specific subscriber station. Null spaces are well known in the field of linear algebra.

Figure 1:
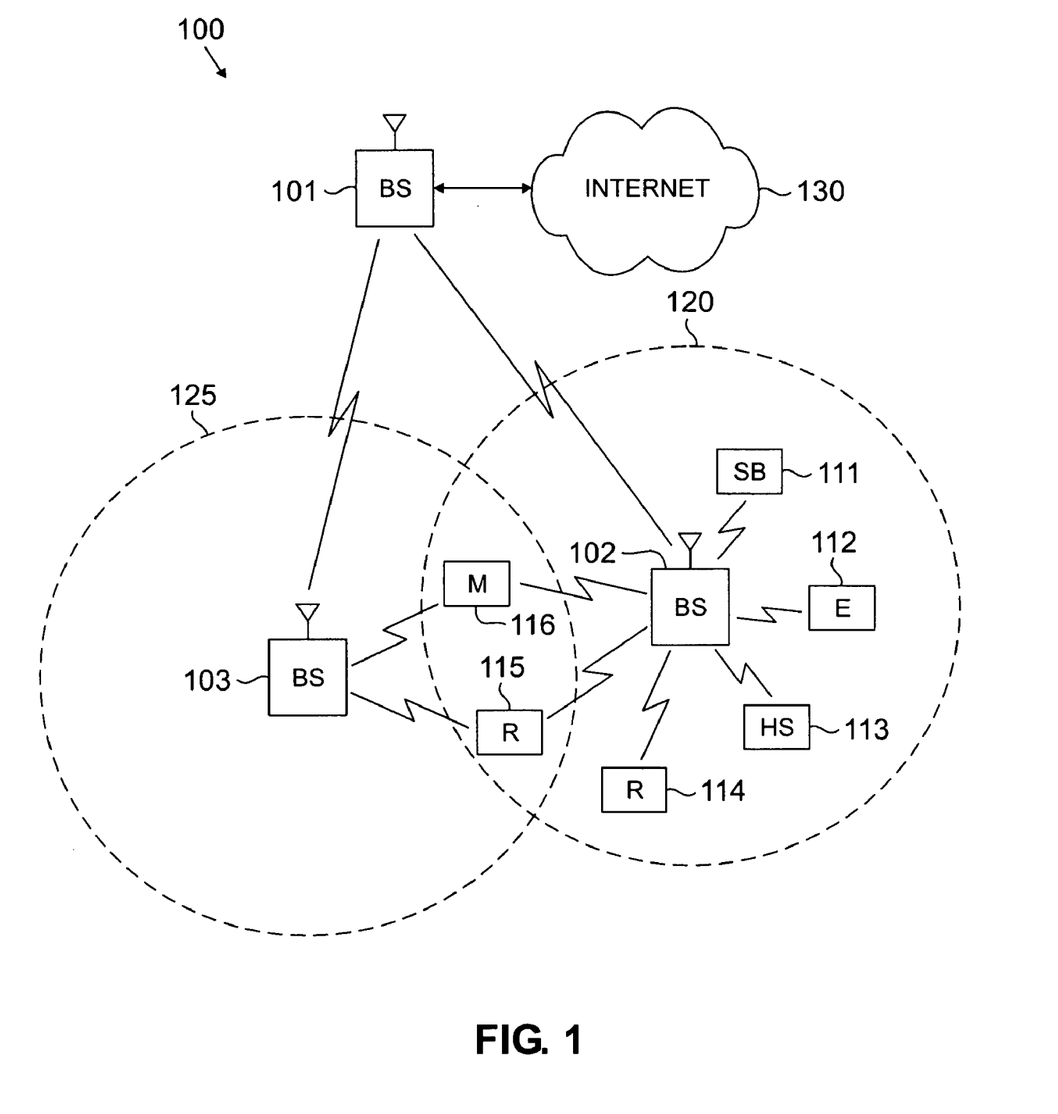
FIG. 1 illustrates an exemplary wireless network that implements a downlink scheduler.

FIG. 1 illustrates exemplary wireless network 100, which implements a downlink scheduler according to the principles of the present disclosure. In the illustrated embodiment, wireless network 100 includes base station (BS) 101, base station (BS) 102, and base station (BS) 103. Base station 101 is in communication with base station 102 and base station 103. Base station 101 is also in communication with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115, and subscriber station (SS) 116. In the exemplary embodiment, SS 111 is located in a small business, SS 112 is located in an enterprise, SS 113 is located in a WiFi hotspot, SS 114 is located in a first residence, SS 115 is located in a second residence, and SS 116 is a mobile device.

Base station 103 provides wireless broadband access to network 130, via base station 101, to a second plurality of subscriber stations within coverage area 125 of base station 103. The second plurality of subscriber stations includes subscriber station 115 and subscriber station 116.

In other embodiments, base station 101 may be in communication with either fewer or more base stations. Furthermore, while only six subscriber stations have been depicted in FIG. 1 to avoid cluttering the drawing, it is understood that wireless network 100 may provide wireless broadband access to many more than six subscriber stations. It is noted that subscriber station 115 and subscriber station 116, associated with the second residence and the mobile device respectively, are on the edge of both coverage area 120 and coverage area 125. Subscriber station 115 and subscriber station 116 each communicate with both base station 102 and base station 103 and may be said to be operating in soft handoff, as known to those of skill in the art.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight with base station 102 and base station 103. Base station 102 and base station 103 may each communicate through non-line-of-sight with subscriber stations 111-116 using OFDM and/or OFDMA techniques.

Base station 102 may provide T1-level service to subscriber station 112 associated with the enterprise and fractional T1-level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115, and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from about 2 kilometers to about fifty kilometers from the base stations.

As is well known in the art, a base station, such as base station 101, 102, or 103, may employ directional antennas to support a plurality of sectors within the coverage area. While in FIG. 1 base stations 102 and 103 are depicted approximately in the center of coverage areas 120 and 125, respectively, in other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. The servers, Internet gateway, and public switched telephone network gateway are not shown in FIG. 1. In another embodiment, the connection to network 130 may be provided by different network nodes and equipment.

Figure 2:
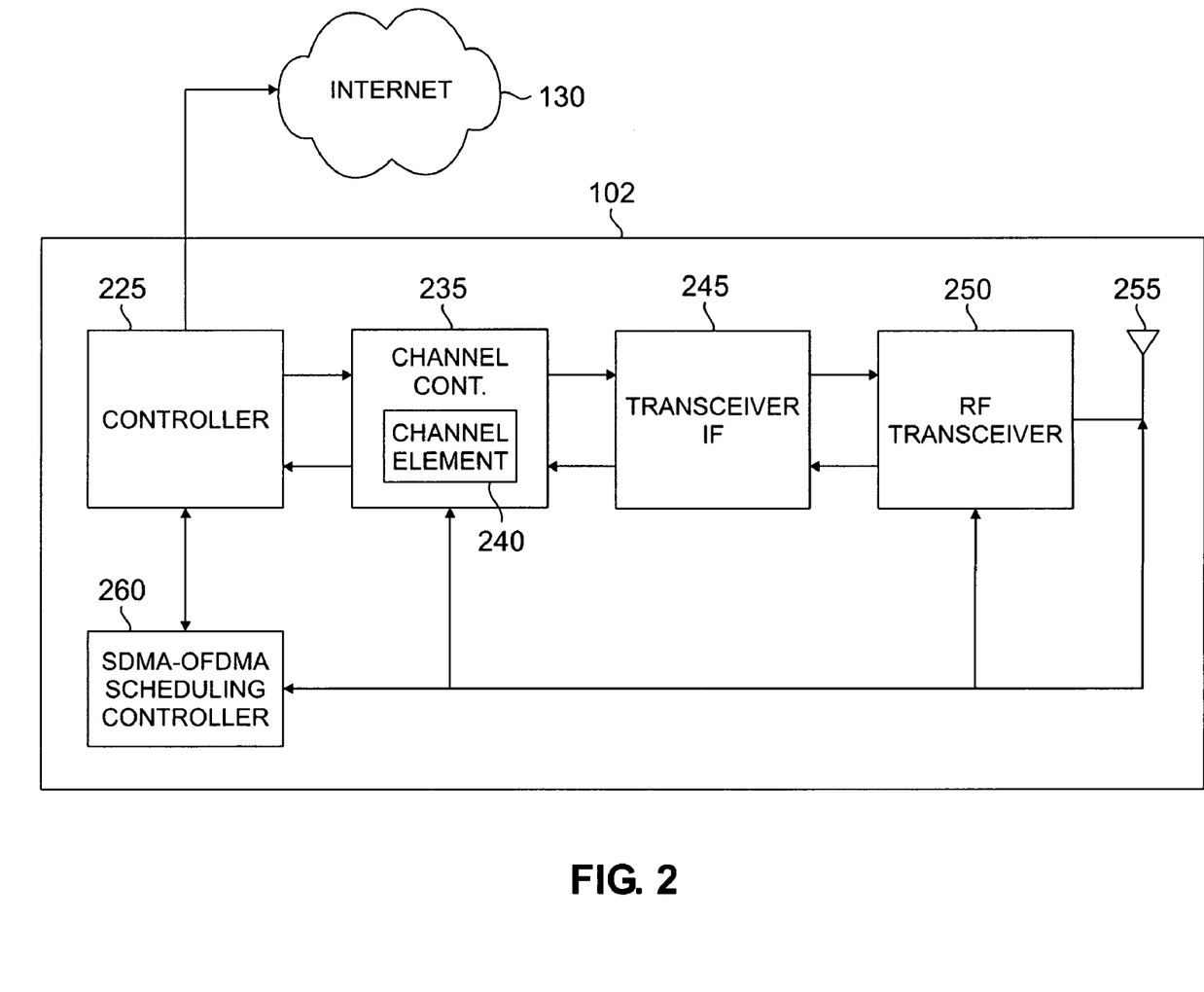
FIG. 2 illustrates in greater detail an exemplary base station that implements an SDMA-OFDMA scheduling algorithm.

FIG. 2 illustrates in greater detail exemplary base station 102, which implements an SDMA-OFDMA scheduling algorithm according to the principles of the present disclosure. Base station 102 is illustrated by way of example only. However, it will be understood that the components illustrated and described with respect to base station 102 are also part of base stations 101 and 103. According to one embodiment, base station 102 comprises controller 225, channel controller 235, transceiver interface (IF) 245, radio frequency (RF) transceiver unit 250, antenna array 255, and spatial division multiple access, orthogonal frequency division multiple access (SDMA-OFDMA) scheduling controller 260.

Controller 225 comprises processing circuitry and memory capable of executing an operating program that controls the overall operation of base station 102. In an embodiment, the controller 225 may be operable to communicate with network 130. Under normal conditions, controller 225 directs the operation of channel controller 235, which comprises a number of channel elements, such as exemplary channel element 240, each of which performs bidirectional communication in the forward channel and the reverse channel. A forward channel (or downlink) refers to outbound signals from base station 102 to subscriber stations 111-116. A reverse channel (or uplink) refers to inbound signals from subscriber stations 111-116 to base station 102. Channel element 240 also preferably performs all baseband processing, including processing any digitized received signal to extract the information or data bits conveyed in the received signal, typically including demodulation, decoding, and error correction operations, as known to those of skill in the art. Transceiver IF 245 transfers bidirectional channel signals between channel controller 235 and RF transceiver unit 250.

Antenna array 255 transmits forward channel signals received from RF transceiver unit 250 to subscriber stations 111-116 in the coverage area of base station 102. Antenna array 255 is also operable to send to RF transceiver unit 250 reverse channel signals received from subscriber stations 111-116 in the coverage area of the base station 102. According to one embodiment of the present disclosure, antenna array 255 comprises a multi-sector antenna, such as a three-sector antenna in which each antenna sector is responsible for transmitting and receiving in a coverage area corresponding to an arc of approximately 120 degrees. Additionally, RF transceiver unit 250 may comprise an antenna selection unit to select among different antennas in antenna array 255 during both transmit and receive operations.

In an advantageous embodiment, each sector of antenna array 255 comprises multiple antenna elements that enable antenna array 255 to use well-known beamforming techniques to implement spatial division multiple access (SDMA) over the OFDMA channels, for example, communicating concurrently in the same frequency bandwidth to multiple spatially separated subscriber stations using independent spatially directed beams. SDMA-OFDMA scheduling controller 260 implements an improved scheduling algorithm for the SDMA-OFDMA channels of base station 101. SDMA-OFDMA scheduling controller 260 controls the timing of the transmissions of the channel elements 240 in channel controller 235. SDMA-OFDMA scheduling controller 260 communicates with RF transceiver 250 and antenna array 255 to control the beamforming of signals transmitted in the forward channels (downlink) of base station 102. In FIG. 2, SDMA-OFDMA scheduling controller 260 is shown as a separate controller from controller 225. However, in an alternate embodiment, SDMA-OFDMA scheduling controller 260 may be implemented in software as a function of controller 225.

Figure 3:
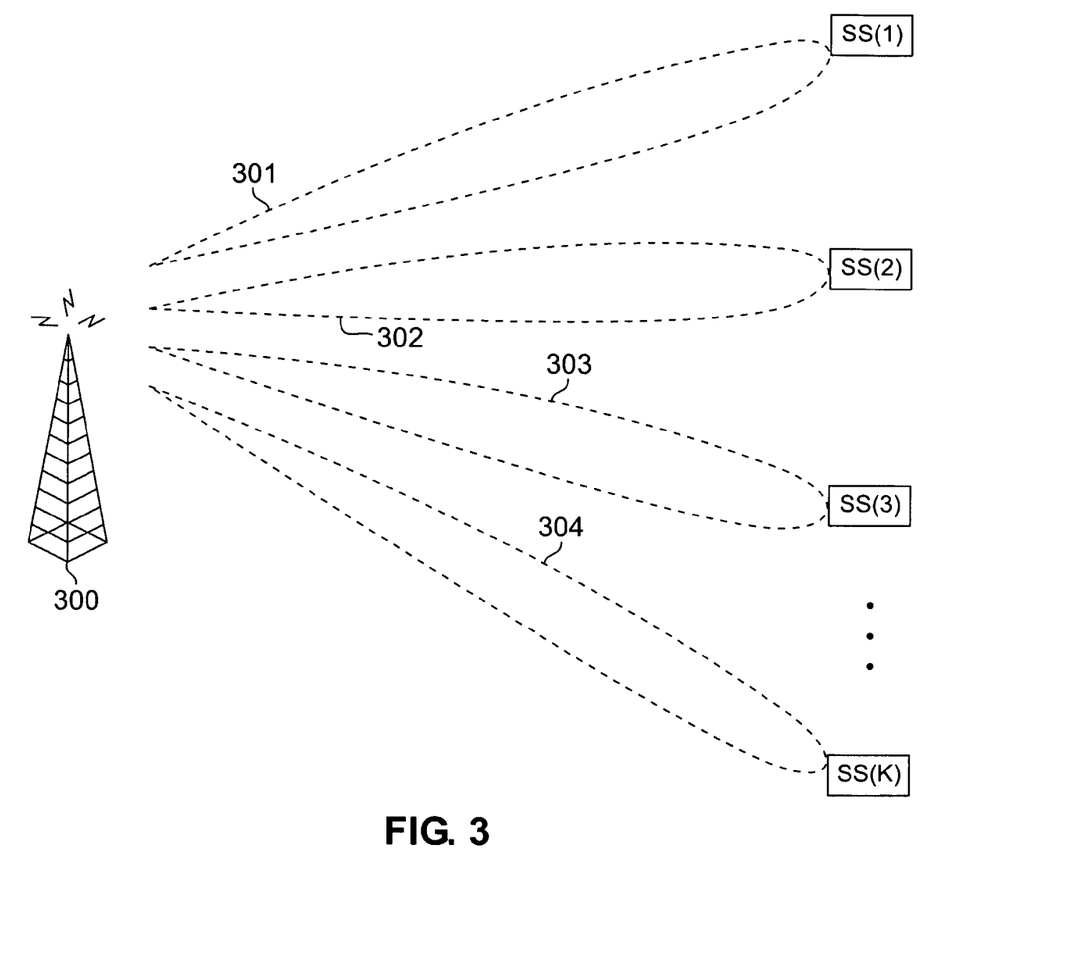
FIG. 3 illustrates the transmission of forward channel traffic using beamforming techniques.

FIG. 3 illustrates the transmission of forward channel traffic using beamforming techniques. Base station 300 transmits a plurality of spatially directed forward channel beams to K subscriber stations, including representative subscriber stations SS(1), SS(2), SS(3) and SS(K). Base station 300 represents any of base stations 101-103 in FIG. 1 or any other base station in wireless network 100. SS(1), SS(2), SS(3) and SS(K) represent subscriber stations 111-116 in FIG. 1 or any other subscriber stations accessing wireless network 100.

The spatially directed beams transmitted by base station 300 include beams 301-304. Beam 301 is the spatially directed beam that transmits forward channel (or downlink) voice and data packets to SS(1). Beam 302 is the spatially directed beam that transmits forward channel (or downlink) voice and data packets to SS(2). Beam 303 is the spatially directed beam that transmits forward channel (or downlink) voice and data packets to SS(3). Beam 304 is the spatially directed beam that transmits forward channel (or downlink) voice and data packets to SS(K).

The scheduling algorithm performed by SDMA-OFDMA scheduling controller 260 maximizes the data throughput of base station 300 while maintaining fairness among the K subscriber stations served by base station 300. SDMA-OFDMA scheduling controller 260 increases spectral efficiency by re-using the spectral resources on multiple spatially-separated subscriber stations, that is, by transmitting independent information concurrently to multiple subscriber stations using the same frequency bandwidth using separate beams.

In the description that follows, a sub-channel (SC) is an OFDMA time-frequency slot. The carrier-to-interference and noise ratio (CINR) parameter is periodically reported to base station 300 by each subscriber station on all sub-channels. Each subscriber station measures the CINR parameter based on a pilot signal transmitted by base station 300 at a fixed power for each sub-channel. The signal-to-interference plus noise ratio (SINR) parameter represents the quality of the received data channel at the subscriber station. The SINR and CINR parameter are related by the equation:

$$SINR = CINR * AssignedBSPower * BeamformingGain. \quad [\text{Eqn. 1}]$$

Additionally, multi-user diversity gain (MUDG) is a selection diversity gain achieved by allocating resources to the subscriber stations that can most efficiently use the resources, based on the channel conditions, as indicated by the CINR in general. The SNR parameter represents the signal-to-noise ratio and the SIR parameter represents the signal-to-interference ratio. In the description that follows, it is assumed that 1) full transmit power is used at all times and 2) base station 300 has a full buffer for all subscriber stations.

Base station 300 communicates simultaneously with K subscriber stations. In a time-division duplexing (TDD) system, the reverse link spatial channels are identical to the forward link spatial channels and may be estimated by base station 300. The spatial channel (or spatial signature) from base station 300 to the $k^{th}$ subscriber station is represented by a column vector, $a_k$. It is noted that this disclosure uses bold face type to indicate vector terms and matrix terms. Each of the elements in the spatial signature $a_k$ is a complex scalar value associated with one of the antenna elements in antenna array 255. For example, if there are four antenna elements, the spatial signature $a_1$ for SS(1) is the column vector $[a_{11}\ a_{12}\ a_{13}\ a_{14}]^T$, where $a_{11}$, $a_{12}$, $a_{13}$, and $a_{14}$ are complex scalar values that define the magnitude and phase changes that the signal transmitted from SS(1) experiences by the time that it is received at the base station. Each spatial signatures $a_k$ is normalized such that the second norm of $a_k$ is 1 (i.e., $\|a_k\|=1$), for all k. Each subscriber station reports to base station 300 the CINR measurements for each sub-channel based on a pilot signal transmitted at a known and fixed power over a wide beam.

In an advantageous embodiment, SDMA-OFDMA scheduling controller 260 uses the proportional fair scheduling (PRF) algorithm. SDMA-OFDMA scheduling controller 260 implements a two-step approach to resource allocation. First, SDMA-OFDMA scheduling controller 260 schedules sub-channels to subscriber stations. Second, SDMA-OFDMA scheduling controller 260 performs optimal power allocation over the sub-channels.

The algorithm implemented by SDMA-OFDMA scheduling controller 260 maximizes the total base station throughput, while allowing a relative fair sharing of the channel resources. The proportional fair (PRF) scheduling algorithm is well known to those skilled in the art and need not be explained in greater detail herein. The PRF scheduling algorithm independently assigns a time slot to a subscriber station, SS(k), based on the following maximum priority criteria:

$$SS(k) = \arg_k \max\left[\frac{V(k)}{T(k)^\alpha}\right],\qquad\text{[Eqn. 2]}$$

where V(k) is the maximum supportable rate for the $k^{th}$ subscriber station during the current time-frequency slot, T(k) is the average throughput rate of the $k^{th}$ subscriber station, and α is a fairness variable between 0 and infinity (∞). Because T(k) increases over time as SS(k) is selected, fairness may be supported When α=1, the scheduling algorithm implemented by SDMA-OFDMA scheduling controller 260 is a PRF scheduling algorithm. When α=0, SDMA-OFDMA scheduling controller 260 is a maximum throughput scheduler. When α=∞, SDMA-OFDMA scheduling controller 260 acts as a round-robin scheduler. If the scheduling algorithm performed by SDMA-OFDMA scheduling controller 260 is followed by an optimal power allocation across the sub-channels, then throughput through the base station is maximized.

The SDMA-OFDMA scheduling algorithm implemented by SDMA-OFDMA scheduling controller 260 uses the spatial signatures of all the subscriber stations $[a_1 \ldots a_K]$ in the current sector. The SDMA-OFDMA scheduling algorithm is performed continuously for every sub-channel (SC) of every sector of every base station.

In a first step in the algorithm, SDMA-OFDMA scheduling controller 260 initializes a counter, i=1. For a specific time-frequency slot, SDMA-OFDMA scheduling controller 260 scheduled the first subscriber station, $k_1$, according to the maximum priority criteria set forth in Equation 2 above.

In a second step in the algorithm, SDMA-OFDMA scheduling controller 260 defines the null space matrix, $T_i$, of the selected subscriber station according to:

$$T_i = I - D(D^H D)^{-1} D,\qquad\text{[Eqn. 3]}$$

where $$D = [a_{k1} \ldots a_{ki}]\qquad\text{[Eqn. 4]}$$

and where I is an identity matrix, and $a_{ki}$ represents the spatial signature of the $i^{th}$ scheduled user.

In the first iteration of the algorithm, the matrix D contains only the column vector, $a_{k1}$, for the first scheduled subscriber station. In subsequent iterations, a new column vector, $a_{ki}$, is added for each $i^{th}$ scheduled subscriber station.

Mathematically, the null space matrix, T, is a projection (or rotation) matrix, which rotates another vector away from the contents of T. The null space matrix, T, may also be called the projection matrix on the null space. Hence, the operation of $v = T a_k$ rotates a vector $a_k$ away from everything that is used to produce the matrix T.

Physically, it means that given the null space matrix, $T_i$, and a spatial signature vector $a_k$ for a certain $k^{th}$ subscriber station, the value $v = T_i a_k$ will be the transmit beam pointing most in the direction of $a_k$, while not interfering with anything used to make up $T_i$. Additionally, the quantity $\|T_i a_k\|^2$ represents the received signal power at the $k^{th}$ subscriber station.

In a third step in the algorithm, SDMA-OFDMA scheduling controller 260 determines the strongest subscriber station in the null space by choosing the subscriber station $k_i$ that satisfies:

$$\hat{k}_i = \max(\|T_i a_1 \alpha_1\| \ldots \|T_i a_K \alpha_K\|)\qquad\text{[Eqn. 5]}$$

where $\alpha_k$ is the CINR as periodically reported by the $k^{th}$ subscriber station for the current sub-channel. It is noted that $\|T_i a_k a_k\|^2$ represents the signal to interference plus noise ratio (SINR) at the $k^{th}$ subscriber station. The strongest subscriber station is the subscriber station to which the strongest transmit beam (i.e., most transmit power) may be sent without interfering with subscriber stations that have already been selected for that time-frequency slot. Thus, the second scheduled subscriber station will not interfere with the first scheduled subscriber station, the third scheduled subscriber station will not interfere with the first and second scheduled subscriber stations, the fourth scheduled subscriber station will not interfere with the first, second and third scheduled subscriber stations, and so forth.

In a fourth step in the algorithm, SDMA-OFDMA scheduling controller 260 increments the counter i=i+1 for the next subscriber station. In a fifth step in the algorithm, SDMA-OFDMA scheduling controller 260 repeats the algorithm from the second step above, until either the maximum number of subscriber stations are assigned or until:

$$\min(\|T_i a_{k_1} \alpha_1\| \ldots \|T_i a_{k_i} \alpha_i\|) < \beta,\qquad\text{[Eqn. 6]}$$

where the value, β, is the lowest SINR threshold at which communication is possible. In essence, the value, β, is a safeguard that determines whether or not the received power at the current subscriber station in the iteration of the algorithm is below a predetermined minimum power threshold. If the received power is below the predetermined minimum power threshold, SDMA-OFDMA scheduling controller 260 stops executing the scheduling algorithm and moves on to the next time-frequency slot.

The beamforming weights for the $k^{th}$ subscriber station is $w_k=T_i a_k$, where $T_i$ is defined in Equation 3 in the $i^{th}$ iteration period and each subscriber station is assigned the same transmit power.

Figure 4:
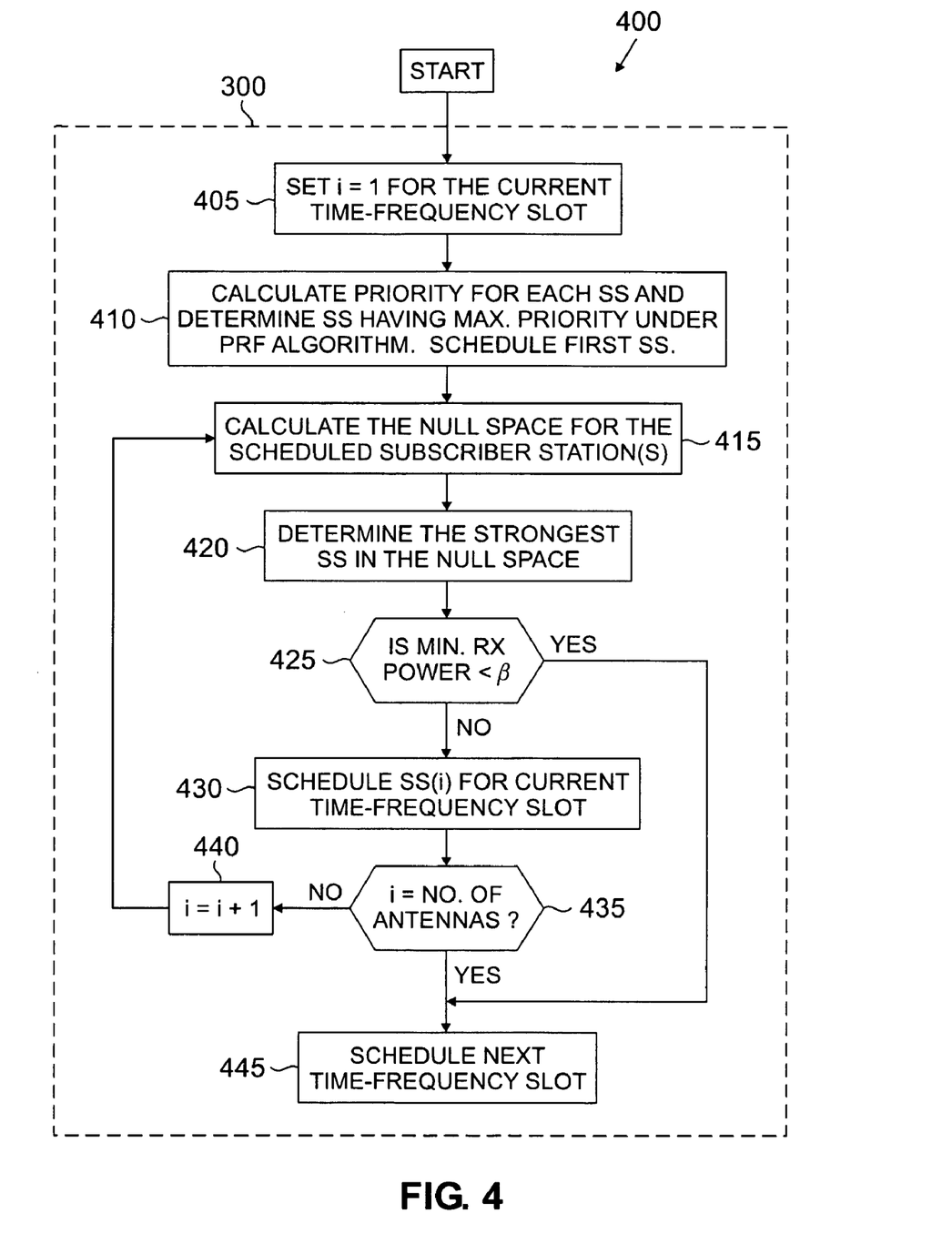
FIG. 4 is a flow diagram illustrating an SDMA-OFDMA scheduling algorithm.

FIG. 4 depicts flow diagram 400, which further illustrates the SDMA-OFDMA scheduling algorithm implemented by SDMA-OFDMA scheduling controller 260. It is assumed that the SDMA-OFDMA scheduling algorithm knows the spatial signatures, namely $[a_1\ a_2\ a_3\ \ldots\ a_K]$, for all of the subscriber stations in the current sector. The SDMA-OFDMA scheduling algorithm is performed continuously for every time-frequency slot of every sector of every cell.

Initially, SDMA-OFDMA scheduling controller 260 initializes i=1 for the $i^{th}$ subscriber station sharing the current sub-channel (i.e., time-frequency slot (process step 405). Next, SDMA-OFDMA scheduling controller 260 calculates the priority for each subscriber station according to a specified priority algorithm and then determines the subscriber station having the maximum priority. By way of example, SDMA-OFDMA scheduling controller 260 may determine priority using the proportional fair (PRF) sharing algorithm according to the equation:

$$SS(k) = \arg_k \max\left[\frac{V(k)}{T(k)^\alpha}\right]. \quad \text{[Eqn. 7]}$$

Once the maximum priority subscriber station, $SS(k_i)$, is determined from the current set of subscriber stations, SDMA-OFDMA scheduling controller 260 selects (schedules) $SS(k_i)$ to receive data in the current time-frequency slot (process step 410).

Next, SDMA-OFDMA scheduling controller 260 calculates the null space for the scheduled subscriber station(s) using Equation 3 above (process step 415). During the first iteration, the null space will be based only on the first subscriber station selected by the PRF sharing algorithm (or other priority algorithm) in step 410 above. During subsequent iterations, the null space will be calculated based on all previously scheduled subscriber station(s).

Next, SDMA-OFDMA scheduling controller 260 determines from the still-unscheduled subscriber stations the strongest unscheduled subscriber station in the null space using Equation 5 above (process step 420). SDMA-OFDMA scheduling controller 260 then determines if the received power at the strongest unscheduled subscriber station is below the predetermined threshold value, $\beta$ (process step 425).

If the received power at unscheduled subscriber station is less than the $\beta$ value ("Yes" decision in step 425), SDMA-OFDMA scheduling controller 260 moves on to the next time-frequency slot (process step 445) and begins flow diagram 400 again. If the received power at the strongest unscheduled subscriber station exceeds the $\beta$ value ("No" decision in step 425), SDMA-OFDMA scheduling controller 260 schedules $SS(k_i)$, the strongest unscheduled subscriber station in the null space, to receive in the current time-frequency slot (process step 430).

Next, SDMA-OFDMA scheduling controller 260 determines if an additional subscriber station may be scheduled (process step 435). The use of the null space mathematically limits the number of subscriber stations that may be scheduled in each time-frequency slot to the number of antennas in antenna array 255. Thus, if antenna array 255 has four antennas, only four subscriber stations may be scheduled in each time-frequency slot. If i equals the number of antennas ("Yes" decision in step 435), SDMA-OFDMA scheduling controller 260 moves on to the next time-frequency slot (process step 445) and begins flow diagram 400 again. If i does not equal the number of antennas ("No" decision in step 435), SDMA-OFDMA scheduling controller 260 increments i=i+1 (process step 440) and returns to process step 415 to calculate the null space for all of the scheduled subscriber station(s).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station capable of communicating with a plurality of subscriber stations in a wireless network, the base station comprising:
    a transceiver capable of transmitting downlink orthogonal frequency division multiple access (OFDMA) signals to the plurality of subscriber stations;
    an antenna array capable of transmitting the downlink OFDMA signals to the plurality of subscriber stations using spatially directed beams; and
    a scheduling controller capable of scheduling downlink transmissions to the plurality of subscriber stations using spatially directed transmit beams, wherein the scheduling controller schedules a first one of the plurality of subscriber stations to receive in a first time-frequency slot based on a first null space of a matrix associated with at least one subscriber station previously scheduled to receive in the first time-frequency slot.

2. The base station as set forth in claim 1, wherein the scheduling controller is capable of determining a second one of the plurality of subscriber stations having a highest priority.

3. The base station as set forth in claim 2, wherein the scheduling controller determines the priority of the second subscriber station using a proportional fair sharing algorithm.

4. The base station as set forth in claim 2, wherein the second subscriber station is one of the at least one subscriber station previously scheduled to receive in the first time-frequency slot.

5. The base station as set forth in claim 2, wherein the scheduling controller is further capable of scheduling a third one of the plurality of subscriber stations to receive in the first time-frequency slot based on a second null space associated with the first subscriber station and the at least one subscriber station previously scheduled to receive in the first time-frequency slot.

6. The base station as set forth in claim 5, wherein the scheduling controller is further capable of comparing a received power associated with the third subscriber station to a minimum power threshold and wherein the scheduling controller, in response to a determination that the received power does not exceed the minimum power threshold, does not schedule the third subscriber station to receive in the first time-frequency slot.

7. The base station as set forth in claim 1, wherein the scheduling controller is further capable of scheduling a second one of the plurality of subscriber stations to receive in the first time-frequency slot based on a second null space associated with the first subscriber station and the at least one subscriber station previously scheduled to receive in the first time-frequency slot.

8. The base station as set forth in claim 7, wherein the scheduling controller is further capable of comparing a received power associated with the second subscriber station to a minimum power threshold and wherein the scheduling controller, in response to a determination that the received power does not exceed the minimum power threshold, does not schedule the second subscriber station to receive in the first time-frequency slot.

9. A wireless network comprising a plurality of base stations capable of communicating with subscriber stations, each one of the plurality of base stations comprising:
  a transceiver capable of transmitting downlink orthogonal frequency division multiple access (OFDMA) signals to a plurality of the subscriber stations;
  an antenna array capable of transmitting the downlink OFDMA signals to the plurality of subscriber stations using spatially directed beams; and
  a scheduling controller capable of scheduling downlink transmissions to the plurality of subscriber stations using spatially directed transmit beams, wherein the scheduling controller schedules a first one of the plurality of subscriber stations to receive in a first time-frequency slot based on a first null space of a matrix associated with at least one subscriber station previously scheduled to receive in the first time-frequency slot.

10. The wireless network as set forth in claim 9, wherein the scheduling controller is capable of determining a second one of the plurality of subscriber stations having a highest priority.

11. The wireless network as set forth in claim 10, wherein the scheduling controller determines the priority of the second subscriber station using a proportional fair sharing algorithm.

12. The wireless network as set forth in claim 10, wherein the second subscriber station is one of the at least one subscriber station previously scheduled to receive in the first time-frequency slot.

13. The wireless network as set forth in claim 10, wherein the scheduling controller is further capable of scheduling a third one of the plurality of subscriber stations to receive in the first time-frequency slot based on a second null space associated with the first subscriber station and the at least one subscriber station previously scheduled to receive in the first time-frequency slot.

14. The wireless network as set forth in claim 13, wherein the scheduling controller is further capable of comparing a received power associated with the third subscriber station to a minimum power threshold and wherein the scheduling controller, in response to a determination that the received power does not exceed the minimum power threshold, does not schedule the third subscriber station to receive in the first time-frequency slot.

15. A method of communicating with a plurality of subscriber stations in a wireless network, the method comprising:
  transmitting downlink orthogonal frequency division multiple access (OFDMA) signals to at least one subscriber station in a first time-frequency slot using spatially directed beams;
  determining a first null space of a matrix associated with the at least one subscriber station; and
  scheduling a first subscriber station to receive in the first time-frequency slot based on the first null space.

16. The method as set forth in claim 15, further comprising determining a second one of the plurality of subscriber stations having a highest priority.

17. The method as set forth in claim 16, wherein determining the priority of the second subscriber station comprises using a proportional fair sharing algorithm.

18. The method as set forth in claim 16, wherein the second subscriber station is one of the at least one subscriber station previously scheduled to receive in the first time-frequency slot.

19. The method as set forth in claim 16, further comprising:
  determining a second null space associated with the first subscriber station and the at least one subscriber station; and
  scheduling a third one of the plurality of subscriber stations to receive in the first time-frequency slot based on the second null space.

20. The method as set forth in claim 19, further comprising:
  comparing a received power associated with the third subscriber station to a minimum power threshold;
  in response to a determination that the received power does not exceed the minimum power threshold, refraining from scheduling the third subscriber station to receive in the first time-frequency slot.

* * * * *